April 15, 1958 A. J. NAGEL 2,830,512
PHOTOGRAPHIC APPARATUS
Filed March 26, 1954 3 Sheets-Sheet 1

INVENTOR:
Aloysius J. Nagel,
BY
Ooms, McDougall, Williams & Hersh,
ATTORNEYS.

April 15, 1958   A. J. NAGEL   2,830,512
PHOTOGRAPHIC APPARATUS
Filed March 26, 1954   3 Sheets-Sheet 2

INVENTOR:
Aloysius J. Nagel.
BY
Orms, McDougall, Williams & Hersh,
ATTORNEYS.

April 15, 1958  A. J. NAGEL  2,830,512
PHOTOGRAPHIC APPARATUS
Filed March 26, 1954  3 Sheets-Sheet 3
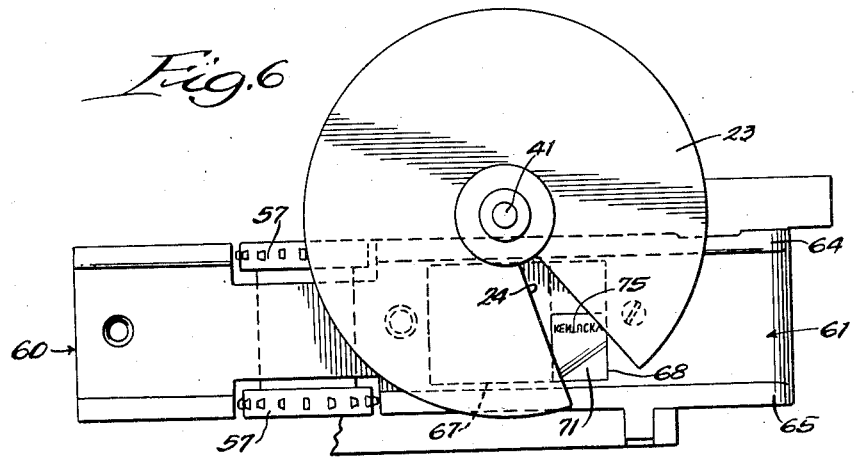
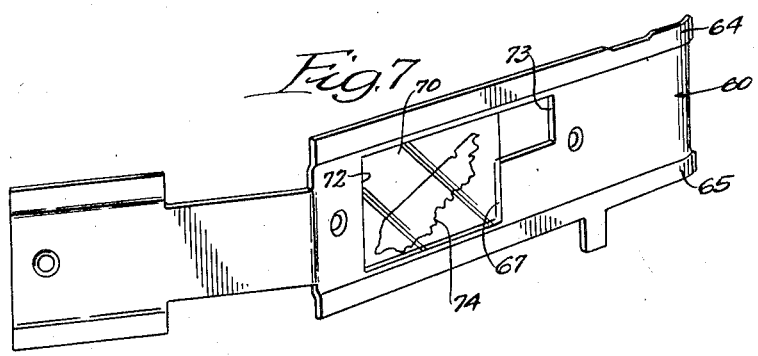
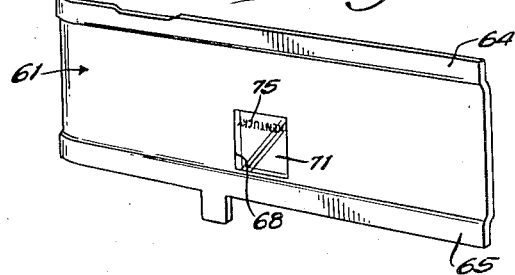
INVENTOR:
Aloysius J. Nagel,
BY
Owen, McDougall, Williams & Hersh.
ATTORNEYS.

United States Patent Office

2,830,512
Patented Apr. 15, 1958

2,830,512

PHOTOGRAPHIC APPARATUS

Aloysius J. Nagel, Louisville, Ky.

Application March 26, 1954, Serial No. 419,039

4 Claims. (Cl. 95—1.1)

This invention relates to photographic devices and comprises an improvement in cameras for making composite photographs of a plurality of subjects.

The invention is particularly, but by no means exclusively applicable to cameras of the type having two oppositely facing lenses for producing images of two different subjects on opposite sides of photographically sensitive film or other material. One important use for such cameras resides in producing photographic identification cards combining a photographic image of the person to be identified with pertinent data regarding the person, such as his name, address, physical characteristics, signature, and one or more finger prints, for example.

An object of the invention is to provide an identification camera or other composite camera of the foregoing character, having means for superimposing one or more additional images upon either or both of the lens-formed images. It is contemplated that such additional images may assume any suitable or desired form, such as an identifying design, written information, suitable lettering, or the outline of a state or other geographical subdivision, for example.

It is another object of the invention to provide a composite camera having means for superimposing additional images upon the lens-formed images in such a manner that the resulting composite photographs will defy efforts aimed at forgery or duplication.

A further object is to provide a composite camera arranged to superimpose additional images upon the lens-formed images in such a manner as to modify the lens-formed images at the regions of intersection or overlapping between the lens-formed and the additional images.

Further objects and advantages of the invention will appear from the following description of an illustrative embodiment of the invention, as shown in the accompanying drawings, in which:

Fig. 6 is an enlarged, fragmentary front view of the camera, with the front lens removed to reveal details of a shutter and a pair of masking or pressure plates embodied in the camera of Fig. 1;

Fig. 7 is a perspective view of a rear masking or pressure plate employed in the camera; and Fig. 8 is a perspective view of a front masking plate utilized in the camera of Fig. 1.

In illustrating and describing an exemplary embodiment of the invention, it is not the intention to limit the invention to the details of such embodiment. Rather, it is the intention to cover all equivalents, modifications, and alternative constructions falling within the true scope of the invention as disclosed in the specification and drawings and defined in the appended claims.

Figure 2:
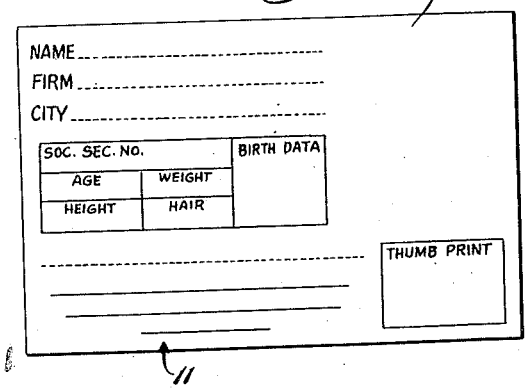
Fig. 2 illustrates a blank data card upon which identifying data may be entered so that the card will serve as one of the subjects to be photographed by the camera.
Figure 3:
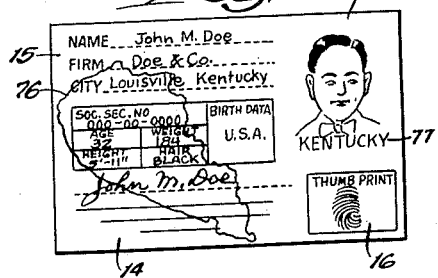
Fig. 3 is a representation of a composite photograph produced by the identification camera.

Considered in detail, the drawings illustrate an identification camera 10 adapted to produce a composite photograph of a person to be identified and a data card 11 (Fig. 2) or the like. Before being photographed the data card 11 may be filled out with any desired data such as the person's name, address, employer, social security number, physical characteristics, citizenship, and signature. A fingerprint of the person may also be affixed, if desired. A blank space 12 is left on the illustrated card to provide room for a photographically superimposed image of the person to be identified. In a manner to be disclosed presently the camera is capable of producing a photographic identification card 14 (Fig. 3) combining identifying written data 15, a thumb print 16, and a photograph 17.

Figure 1:
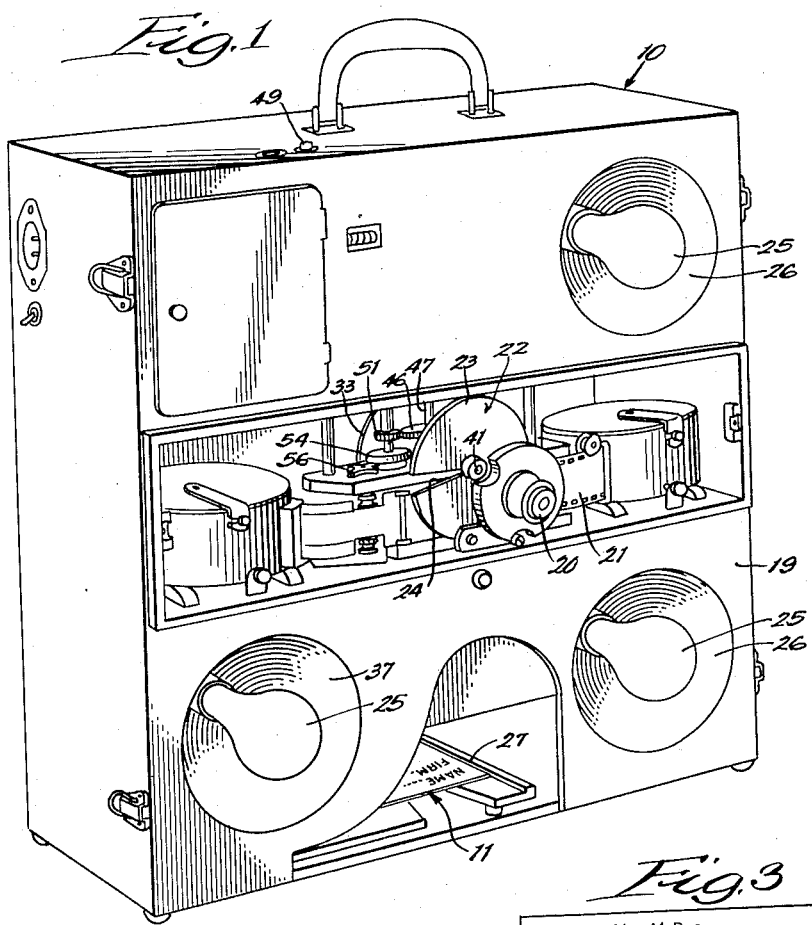
Figure 1 is a general perspective view of an exemplary identification camera constructed in accordance with the invention, a front cover plate of the camera being removed to reveal certain details of construction.

In order to photograph the person to be identified, the camera 10 is equipped with a housing 19 supporting a front lens 20 (Fig. 1) adapted to form an image of the subject upon the front face of photographically sensitive material 21, which may be in any suitable form, but in this instance comprises a strip of motion picture film. A shutter 22 is employed to govern the duration of the exposure of the film 21. While any suitable type of shutter may be employed, the illustrated shutter comprises a rotatable disk 23 having a cutout sector 24.

The person to be photographed may be illuminated by means of a plurality of electric lamps 25 mounted in reflectors 26 recessed into the front face of the housing 19.

In order to photograph the data card 11, the camera 10 is provided with a stand or table 27 (Figs. 1 and 4) for receiving the card. This stand may be mounted in the lower portion of the housing 19. An electric lamp 28 may be disposed inside the housing to illuminate the card 11.

In the illustrated camera 10, a mirror 30 or other reflecting element is employed to reflect light from the card into a rear lens 31 adapted to focus an image of the card upon the rear face of the photographic film 21. The duration of the exposure of the film is determined by a rear shutter 32, illustrated as comprising a rotatable disk 33 having a cutout sector 34.

Any suitable operating mechanism may be provided to operate the shutters 22 and 32, so as to make a composite exposure of the film 21, and then to advance the film to condition the camera for making another exposure. Accordingly, it will suffice to note that the illustrated camera 10 comprises an operating mechanism 40 (Figs. 4 and 5) which includes a shaft 41 supporting the shutter disks 23 and 33. Bevel gears 42 and 43 are employed to connect the shaft 41 to a vertical shaft 44, which is equipped with a gear 45 meshing with a gear 46 on an adjacent vertical shaft 47. Motive power for rotating the disks 23 and 33 is provided by an electric motor 48 connected to the shaft 47. By means of any suitable or known switching arrangement (not shown) the motor 48 may be energized for an interval sufficient to effect a single revolution of the shaft 41. The energization of the motor may be controlled by means of a push button 49 on the top of the housing 19.

To advance the film 21 after each exposure, the gear 46 is arranged to mesh with a gear 51 which operates a suitable intermittent drive 52. In this instance, the drive 52 includes a pair of pins 53 mounted on a disk 54 secured to the gear 51. The pins 53 are arranged to mesh at intervals with radial slots 55 formed in the arms of a star wheel 56. One or more sprockets 57 are secured to the star wheel to engage the film 21. Toward the end of each revolution of the shutter disks 23 and 33, the pins 53 engage successive arms of the star wheel 56 so as to advance the wheel two steps.

Figure 4:
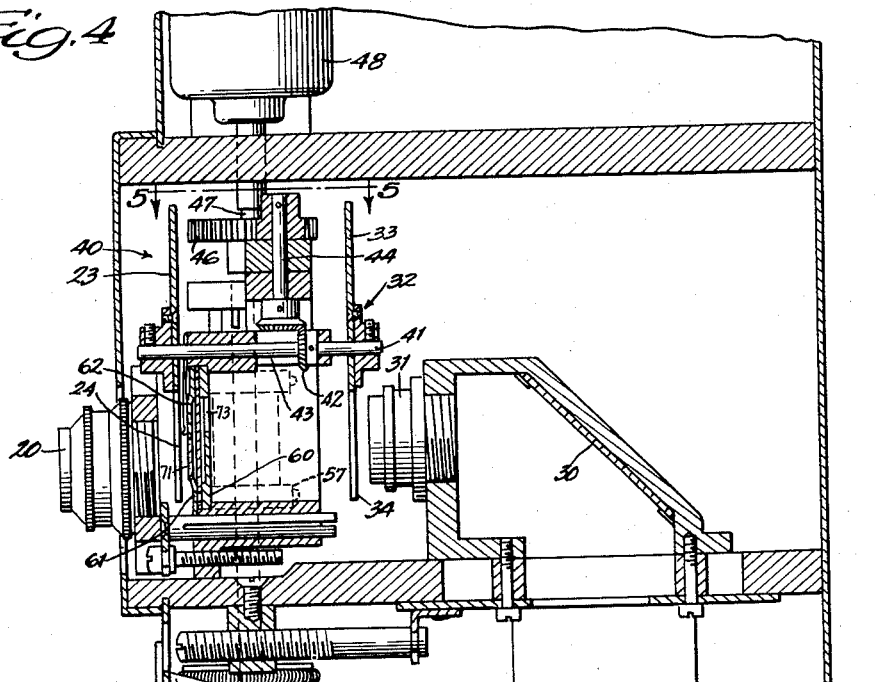
Fig. 4 is a fragmentary, enlarged, elevational, sectional view showing details of construction of the camera of Fig. 1.
Figure 5:
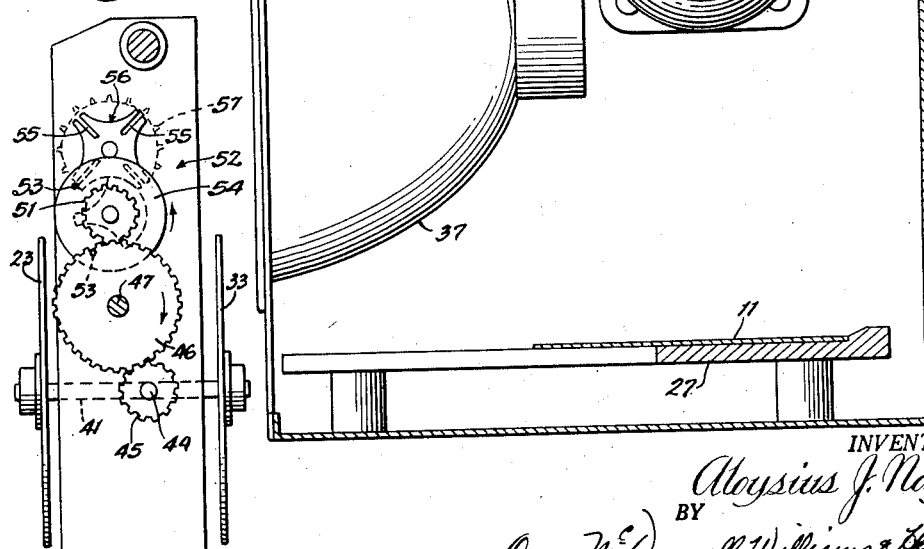
Fig. 5 is a fragmentary, sectional view taken generally along a line 5—5 in Fig. 4 to show details of the mechanism for advancing the photographic film.

To guide the film 21 along the focal plane shared in common by the lenses 20 and 31, the camera 10 is equipped with rear and front pressure plates 60 and 61 (Fig. 4). One or more springs 62 may be provided to press the front plate 61 rearwardly toward the rear plate 60. The pressure plates 60 and 61 may be formed with inwardly offset upper and lower edge portions 64 and 65 so that only the edge portions of the film 21 will be engaged by the plates.

In order that the pressure plates 60 and 61 may serve as masking elements, they may be formed with respective openings or windows 67 and 68 (Figs. 6 to 8) overlying the portions of the film 21 to be exposed with the respective images of the data card 11 and the person to be identified. The areas bounded by the openings 67 and 68 may be arranged to overlap or not, as desired.

To provide for the formation of additional images in superimposed relation to the lens-formed images, the masking or pressure plates 60 and 61 are fitted with image-forming plates 70 and 71 disposed in the respective openings 67 and 68. The plates 70 and 71 may be made of any suitable transparent material such as glass or a transparent plastic material. Each of the image-forming plates may be arranged to cover the entire area of its opening, or only a portion of the area, as desired. Thus, it will be seen that the illustrated plate 70 covers one portion 72 of the opening 67 while leaving another portion 73 uncovered. In this instance, the fingerprint of the subject is projected through the opening 73, while the other identifying data are projected through the opening 72.

Formed on the plates 70 and 71 are images or inscriptions 74 and 75 adapted to intercept light projected through the plates and thus to form corresponding images 76 and 77 (Fig. 3) on the photographic film, in superimposed relation to the lens-formed images. The inscriptions 74 and 75 may be engraved, etched, printed, painted, or otherwise affixed to the plates 70 and 71, engraved or etched inscriptions being preferred, however. Inscriptions of any desired form may be employed, either to supply additional identifying data, or to add a suitable design or desired lettering to the composite photograph. Thus, the inscription 74 is illustrated as comprising the outline of the State of Kentucky, while the inscription 75 comprises the word "Kentucky." Inscriptions of this sort are particularly well suited for producing drivers' licenses or other identification cards associated particularly with a state or other political entity.

It has been found that the additional superimposed images formed by the inscriptions on the transparent plates are extremely difficult to duplicate by spurious methods and, hence, make forgery virtually impossible. At the zones of intersection or overlapping between the lens-formed images and the images formed by the inscriptions, the lens-formed images are modified appreciably. This modification is in the nature of a peculiar haziness imparted to the lens-formed images by the additional images. This hazy quality defies duplication by other means. Hence, forgery may be detected readily by examination of the images with a magnifying glass. While it is not fully understood how this modification of the lens-formed images is brought about, it is believed that the inscriptions diffuse and scatter the light derived from the lenses and, hence, impart an indistinct hazy quality to the lens-formed images.

It will be apparent that the present invention provides an improved identification camera which enhances identification security by largely obviating the possibility of forgery. Moreover, the identification camera, by superimposing additional images upon the lens-formed images may be arranged to supply additional identifying data.

It will be apparent that various equivalents, modifications, and alternative constructions may be employed without departing from the spirit and scope of the following claims.

I claim:

1. In a photographic identification camera, the combination comprising first and second adjacent masking plates, means for advancing translucent photographically sensitive film between said plates, said plates having respective framing openings therein defining first and second contiguous exposure areas on opposite sides of the film, a first lens in front of said first plate for focusing an image of a person to be identified on said first area, means for holding a printed identification record form, means for illuminating the form, means including a second lens for focusing an image of the record form on said second area, respective shutters for controlling the transmission of light to said openings, and first and second transparent plates in said respective openings, said plates having first and second identification marking grooves engraved therein over substantial portions of said exposure areas for producing corresponding images on the film in superimposed relation to the lens-formed images, said second identification markings producing an image intersecting and intermingling with the lens-formed image of the identification record form.

2. In a photographic identification camera, the combination comprising first and second adjacent masking plates, means for advancing photographically sensitive film therebetween, said plates having respective framing openings therein defining first and second adjacent exposure areas on opposite sides of the film, a first lens in front of said first plate for focusing an image of a person to be identified on said first area, means for holding an identification record form, means including a second lens for focusing an image of the record form on said second area, respective shutters for controlling the transmission of light to said openings, first and second transparent plates in said respective openings and closely adjacent the position of the film, at least one of said plates having light-scattering and partially light-transmitting marking grooves formed therein along a substantial portion thereof and extending over a substantial portion of the corresponding exposure area for registration on the film as corresponding markings of fuzzy quality intermingled with the lens-formed image and varying in tonal gradation with variations in the image.

3. In a photographic device, the combination comprising holding means for holding photographically sensitive sheet material in a predetermined position, a lens opposite said holding means for projecting an image on the material, a transparent plate interposed between said lens and said position of the material and closely adjacent said position, said plate having partially light-transmitting markings in the form of grooves engraved therein and extending over a substantial portion of said plate for registration on the material in superimposed relation to said image as corresponding markings varying in tonal gradations with the image and of a fuzzy quality at intersections with elements of the image.

4. In a photographic device, the combination comprising holding means for holding thin photographically sensitive material in a predetermined position, a thin transparent plate-like member closely adjacent said position, means for projecting a light-formed image through said transparent member onto the sensitive material, and partially light-transmitting and light-scattering marking grooves formed in said transparent member along a substantial surface portion thereof for registration on the sensitive material in intermingled relation to the image as corresponding markings varying in tonal gradation with the image and of a fuzzy quality, particularly at intersections with elements of the image.

References Cited in the file of this patent

UNITED STATES PATENTS

| | | |
|---|---|---|
| 1,604,765 | Caps | Oct. 26, 1926 |
| 1,674,540 | Bagley | June 19, 1928 |
| 1,722,935 | Messter | July 30, 1929 |
| 2,083,215 | Balaban | June 8, 1937 |
| 2,125,388 | Monroe | Aug. 2, 1938 |
| 2,347,749 | Monroe | May 2, 1944 |

FOREIGN PATENTS

| | | |
|---|---|---|
| 578,363 | Germany | June 13, 1933 |